Dec. 10, 1968       R. GONZALEZ       3,415,414
CUPPED WELDING STUD

Filed Feb. 8, 1965

RICARDO GONZALEZ
INVENTOR
BY
BUCKHORN, BLORE, KLARQUIST & SPARKMAN
ATTORNEYS

Dec. 10, 1968          R. GONZALEZ                3,415,414
                     CUPPED WELDING STUD
Filed Feb. 8, 1965                          2 Sheets-Sheet 2

RICARDO GONZALEZ
INVENTOR
BY
BUCKHORN, BLORE, KLARQUIST & SPARKMAN
ATTORNEYS

United States Patent Office 3,415,414
Patented Dec. 10, 1968

3,415,414
CUPPED WELDING STUD
Ricardo Gonzalez, Milwaukie, Oreg., assignor to Omark Industries, Inc., Portland, Oreg., a corporation of Oregon
Filed Feb. 8, 1965, Ser. No. 431,054
1 Claim. (Cl. 220—91)

ABSTRACT OF THE DISCLOSURE

This invention relates to a cup-shaped welding stud and a method of making the same, and more particularly to a cup-shaped welding stud adapted to form a bail ear for a container and a method of making the same. The cup-shaped welding stud having an outwardly projecting annular flange at one end thereof and a base portion closing the opposite end thereof. The base portion being characterized by a frusto-conical configuration, the apex of said frusto-conical configuration terminating in an outwardly projecting welding tip to establish a welding stud.

---

Studs which are welded by capacitor discharge welding to workpieces have many desirable features including the capacity of being very strongly bonded to the workpieces and being easily handled by automatic feeding and positioning devices of welding machines. Such studs have been solid and of solid, rod-like form, and each has a tip formed on the welding end thereof. For some uses, it is desirable to form a head on the other end of the stud, and the head is difficult to quickly and inexpensively form. The head and the tip make it impractical to form both the tip and the head in a heading machine, and use of an automatic screw machine to make the headed stud is low and expensive. It would be desirable to provide a headed stud which can be manufactured inexpensively and quickly. It would also be desirable to provide a lightweight welding stud of high strength. It would also be desirable to provide a welding stud which would partially overhang and hold an element.

An object of the invention is to provide a cup-shaped welding stud and a method of making the same.

Another object of the invention is to provide a cup-shaped welding stud adapted to form a bail ear for a container and a method of making the same.

A further object of the invention is to provide a lightweight welding stud having a head on one end thereof and a welding tip on the other end thereof.

A further object of the invention is to provide a cupped welding stud which can be fabricated inexpensively and is adapted to be secured by capacitor discharge welding to a workpiece.

Yet another object of the invention is to provide a weldable bail ear and which can be formed from sheet metal in a punch press operation and a method of making the bail ear.

Another object of the invention is to provide a container having capacitor discharge welded bail ears.

Another object of the invention is to provide a method of making a container having welded bail ears.

The invention provides a cupped welding stud and a method of making the same. A method forming a specific embodiment of the invention includes drawing sheet metal blanks into flanged, cup-shaped studs and coining the bottoms of the studs to provide welding tips and relief. The studs may be provided with flanges defining heads and may be welded to a strip at spaced points therealong and the strip be formed into containers. A stud forming a specific embodiment of the invention includes a cup-shaped sheet metal member having a body, an outwardly projecting flange at the rim thereof and a welding tip coined on the bottom thereof, with the bottom face being coined to frusto-conical shape to provide slight relief and facilitate welding the entire bottom surface to a workpiece in a capacitor discharge welding operation.

A complete understanding of the invention may be obtained from the following detailed description of a cupped welding stud, and a method of making the stud forming specific embodiments thereof, when read in conjunction with the appended drawings, in which.

Figure 1:
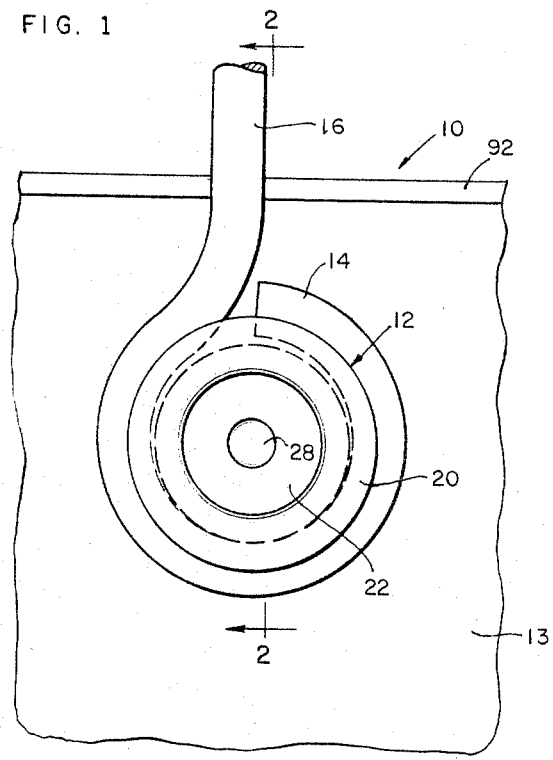
FIG. 1 is a fragmentary side elevation of a container having cupped studs forming bail ears and forming one embodiment of the invention.
Figure 2:
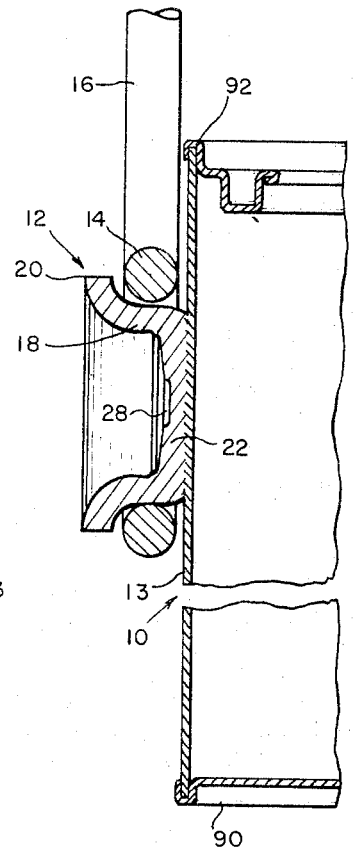
FIG. 2 is a fragmentary, vertical section taken along line 2—2 of FIG. 1.
Figure 3:
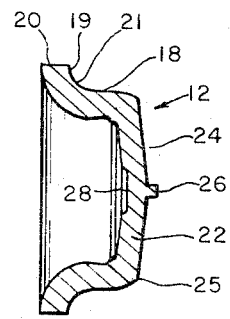
FIG. 3 is a longitudinal section of one of the cupped studs of FIG. 1 prior to securing the stud to the container.
Figure 5:
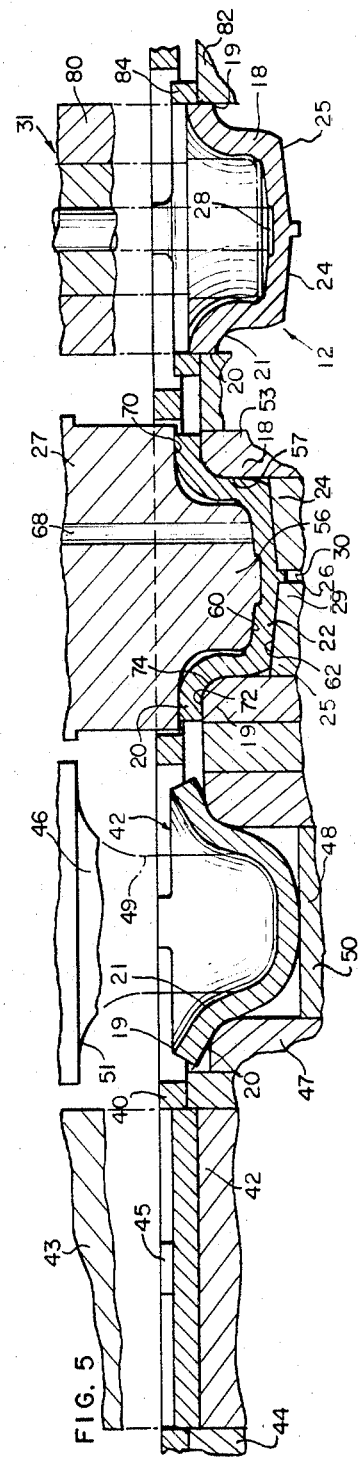
FIG. 5 is a vertictal section taken along line 5—5 of FIG. 4 and showing an apparatus for forming the stud of FIG. 3.

Referring now in detail to the drawings, there is shown therein a sheet metal container 10 (FIGS. 1 and 2) having cupped studs 12 forming one embodiment of the invention. The studs 12 are welded to opposite sides of a cylindrical body 13 of the container, and are headed or flanged to form bail ears on which eyes 14 of a bail 16 are pivotally mounted. Each stud includes a cylindrical body or shank 18 which is flared at its open end to a radially outwardly projecting flange 20, which defines an enlarged head to retain the eye 14 of the bail 16 thereon. The flange 20 has a substantially planar outer portion 19 and a curved portion or fillet 21 joining the planar portion to the shank portion 18. The stud 12 (FIG. 3) while in the form of a welding stud, prior to being welded to the container, has a bottom or base 22 provided with a slightly tapered or frustoconical surface 24 of about 4° off from planar and forming a sharp corner 25 with the exterior surface of the shank 18 and surrounding an approximately axially located welding tip 26. The tip 26 is adapted to start the arc in a capacitor discharge welding operation. The tip 26 is formed in a coining step in which a punch member 27 (FIG. 5) of a punch press die 31 presses a recess 28 in the inner portion of the bottom 22 to force the metal of the tip from the bottom against a die member 29 having a recess 30 of the same shape as the tip. The face 24 also is formed by coining and provides desired relief for the capacitor discharge welding operation.

Figure 4:
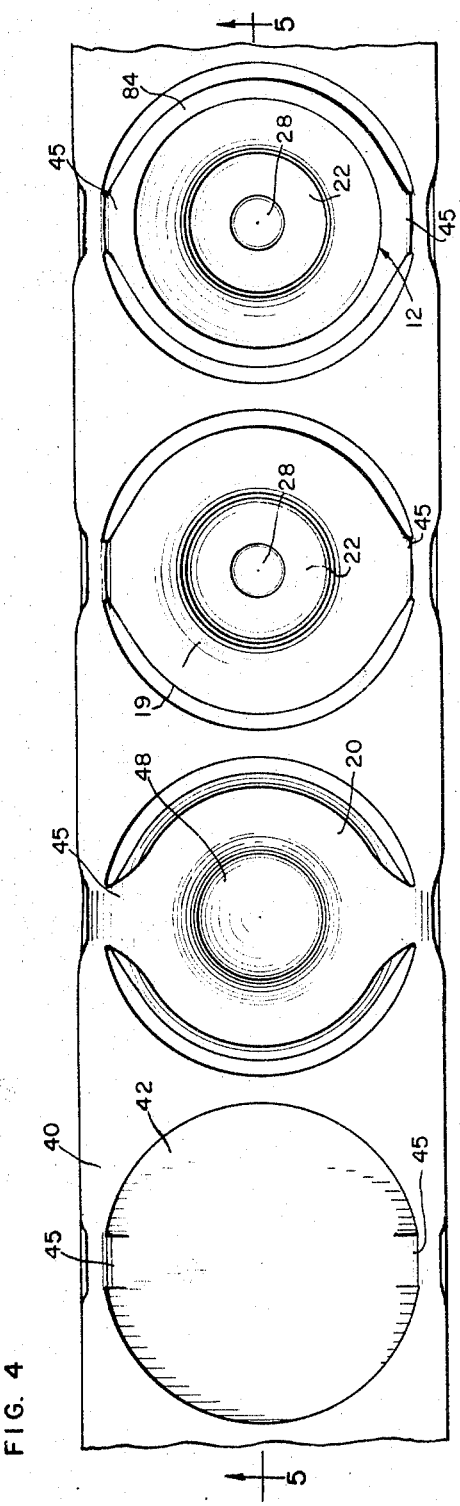
FIG. 4 is a top plan view of a strip of metal in which the stud of FIG. 3 is being formed by a method forming one embodiment of the invention.

In a method of forming the stud 12 comprising one embodiment of the invention, a strip 40 (FIGS. 4 and 5) of drawing grade, cold rolled sheet metal of mild steel, or other suitable metal, such as, for example, aluminum, stainless steel, brass or the like, is advanced step-by-step through the multistage die 31 of the punch press. In the first stage of the die a drawable disc-shaped blank 42 is cut by punch and die members 43 and 44 from the strip completely, except for carrying webs 45, to permit the blank to contract in diameter as it is drawn during the second stage. In the second stage, the central portion of the blank is drawn by opposed drawing die members 46 and 47 into a deep dimple 48 with the flange 20 started. The die member 46 has a cylindral shank portion 49 of a diameter substantially less than the inner diameter of the die member 47, which is tubular, and pushes the central portion of the blank into the upper portion of the die member 47 against a plunger 50, which is spring urged upwardly. The upper end of the die member 47 has a rounded inner edge portion 51 against which the outer edge portion of the blank is pressed and formed partially into the fillet 21 during the drawing step. Then, in the third stage, the punch member 27 and the die member 29 push the crest of the dimple 48 back up in a coining step, form, with a tubular die member 53, the cylindrical shank 18, flatten the flange 20, and form the tip 26, the recess 28, the frustoconical face 24 and the sharp corner 25. Lower end portion 56 of the punch member 27 is generally cylindrical and slightly tapered, and, with cylindrical inner portion 57 of the die member 53, forms the substantially cylindrical shank portion 18 of the stud. Lower end face 60 of the punch member 27 is complementary in shape to the upper face of the bottom 22 of the stud, and the portion of upper end face 62 of the die member 29 surrounding the recess 26 is concave and frustoconical to form the frustoconical lower face 24 of the bottom of the stud, the face 24 preferably being slightly less in diameter than the upper end face 62. Ejector passages 68 for air under pressure are provided for stripping the blank 42 from the punch member 27 after the coining step. An annular shoulder 70 on the punch member 27 and flat outer portion 72 of the upper end of the die member 53 press against opposite sides of the flange 20 to flatten the flange 20 during the coining step, and rounded inner portion 74 of the upper end of the die member 53 serves to form the fillet 21 as the members 27, 29 and 53 coin and form the blank 42. In the fourth stage, the stud 12 is cut completely from the blank 42 by punch and die members 80 and 82 to leave an annular trim 84 in the strip. The stud may then be heat treated and/or a decorative and/or protective coat added, such as, for example, an electrolytic copper flash or nickel may be plated thereon.

While in the method of making the studs disclosed above the studs are shown as being separated from the strip 40 immediately after the forming thereof, if desired, the severing of the studs may be omitted until just before the welding operation takes place and the strip be used to feed the studs in the welder. Also, the studs may be separated from the strip and mounted on a flexible strip which is used to advance the studs into a welder.

In forming the container 10 (FIGS. 1 and 2), a strip of metal from which the bodies like the body 13 are to be formed is advanced in flat condition through a capacitor discharge welding machine (not shown). The welding machine welds the studs 12 to the strip at spaced points therealong, and the strip is severed to form can body blanks, which then are formed into cylinders to form the bodies 13. Bottoms 90 and top rims 92 then are secured to the ends of the can bodies and the eyes 14 of the bails 16 are closed around the studs to mount the bails pivotally on the studs. Obviously, if desired, the cylindrical container may first be formed and then the studs 12 welded thereto.

The above-described cupped welding studs 12 are of a construction well adapted to be manufactured inexpensively in the above-described punch press operation. The welding end portions of the studs while in the welding stud forms are ideally shaped for capacitor discharge welding operations and form very strong, large area welds with the can bodies, the welds being even stronger than the bails ordinarily are. The above-described method of making the studs is very effective while being quite inexpensive and capable of being effected in a simple, punch press operation.

The stud 12 can be used for initial gap as well as initial contact capacitor discharge welding.

The stud 12 serves excellently as a bail ear, and also may be used in many other fasteners and other applications. For example, the stud can be tapped interiorly and receive a threaded element therein, in which instance the flange 20 may be omitted if desired. Further, a roughened pin can be forced into the stud and thus be secured thereto. It is readily apparent that the shank of the studs for some applications may be substantially square, elliptical, polygonal or of any other desired transverse cross-sectional shape. While the tip 26 is shown as being located on the outer end of the stud, for some applications it may be formed on the inside face of the bottom end of the stud, the inside face of the bottom end of the stud being convexly frustoconical. For example, a cup-shaped wheel to fit over an axle and be welded to the end of the axle may have the welding tip so positioned inside the cup-shaped stud. Also, an abrasive member can be fastened by cement or brazing in the stud and the stud welded to an abrading tool.

It is to be understood that the above-described arrangements are simply illustrative of the application of the principles of the invention. Numerous other arrangements may be readily devised by those skilled in the art which will embody the principles of the invention and fall within the spirit and scope thereof.

I claim:

1. A welding stud adapted to be secured by capacitor-discharge welding to a metal workpiece comprising:

a sheet metal member formed into a cylindrical body portion of a predetermined external diameter and having an outwardly projecting annular flange at one end thereof and a base portion closing the opposite end thereof, and said base portion being characterized by a coined frusto-conical configuration sloping about 4° from planar to progressively increase the spacing between said base portion and said workpiece, the outside edge of said frusto-conical configuration forming a sharp corner with said cylindrical body portion and the apex of said frusto-conical configuration terminating in an outwardly projecting welding tip to establish a welding stud having a discrete and controlled welding area.

References Cited

UNITED STATES PATENTS

| | | | |
|---|---|---|---|
| 17,163 | 4/1857 | Masury | 220—91 |
| 646,741 | 4/1900 | Knapp | 220—91 |
| 945,554 | 1/1910 | Lachman | 220—91 |
| 1,670,131 | 5/1928 | Allerton | 220—91 |
| 3,158,285 | 11/1964 | Curtis | 220—91 |
| 3,244,854 | 8/1966 | Bucci et al. | 219—113 |

RAPHAEL H. SCHWARTZ, *Primary Examiner.*

U.S. Cl. X.R.

72—348; 113—120